United States Patent
Heathcoat et al.

(10) Patent No.: US 9,820,441 B2
(45) Date of Patent: Nov. 21, 2017

(54) VEHICLE WITH HYDROSTATIC TRANSMISSION

(71) Applicant: Parker-Hannifin Corporation, Cleveland, OH (US)

(72) Inventors: David Mark Heathcoat, Greeneville, TN (US); Gale Maddy, Greeneville, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 360 days.

(21) Appl. No.: 14/572,030

(22) Filed: Dec. 16, 2014

(65) Prior Publication Data

US 2015/0173299 A1    Jun. 25, 2015

Related U.S. Application Data

(60) Provisional application No. 61/918,724, filed on Dec. 20, 2013.

(51) Int. Cl.
| | |
|---|---|
| *B62D 11/00* | (2006.01) |
| *A01D 69/03* | (2006.01) |
| *B60K 17/10* | (2006.01) |
| *B60K 5/06* | (2006.01) |
| *F16H 47/02* | (2006.01) |
| *B60K 7/00* | (2006.01) |
| *B60K 17/04* | (2006.01) |

(52) U.S. Cl.
CPC ............... *A01D 69/03* (2013.01); *B60K 5/06* (2013.01); *B60K 17/10* (2013.01); *F16H 47/02* (2013.01); *B60K 7/0015* (2013.01); *B60K 17/043* (2013.01); *B60K 2007/0069* (2013.01); *Y10T 74/19149* (2015.01)

(58) Field of Classification Search
CPC ....................................................... A01D 69/03
USPC ......................................................... 180/6.48
See application file for complete search history.

(56) References Cited

U.S. PATENT DOCUMENTS

| | | |
|---|---|---|
| 1,307,819 A | 6/1919 | Janney |
| 4,979,583 A | 12/1990 | Thoma |
| 6,125,630 A | 10/2000 | Abend |
| 7,886,534 B2 | 2/2011 | Dong |
| 8,028,776 B2 | 10/2011 | Dong |
| 8,100,204 B2 | 1/2012 | Dong |

(Continued)

*Primary Examiner* — Jacob D Knutson
*Assistant Examiner* — Conan D Duda
(74) *Attorney, Agent, or Firm* — McDonnell Boehnen Hulbert & Berghoff LLP

(57) ABSTRACT

A vehicle 10 includes a prime mover engine 15, a drive wheel 16, and a hydrostatic transmission 20. The prime mover engine 15 has a substantially vertical prime mover output shaft 18. The hydrostatic transmission 20 has a hydraulic pump 24 with a substantially vertical pump input shaft 28. A drive link 31 drivingly connects the pump input shaft 28 to the prime mover output shaft 18. The hydraulic motor 25 has a substantially vertical output shaft 30. An interface connector 32 establishes fluid pressure communication between the hydraulic pump and the hydraulic motor. A gear set is intermediate the hydrostatic transmission 20 and drive wheel 16. The gear set includes a vertically disposed bevel gear 41 drivingly connected to the motor output shaft 30 and a horizontally disposed bevel gear 42 drivingly connected to the drive wheel 16.

14 Claims, 9 Drawing Sheets

(56) References Cited

U.S. PATENT DOCUMENTS

| | | | |
|---|---|---|---|
| 2002/0108800 A1* | 8/2002 | Irikura | A01D 69/03 180/307 |
| 2003/0070429 A1 | 4/2003 | Jolliff | |
| 2004/0079563 A1* | 4/2004 | Ohashi | A01D 69/03 180/53.1 |
| 2004/0182632 A1* | 9/2004 | Hasegawa | B60K 17/105 180/307 |
| 2004/0221559 A1* | 11/2004 | Abend | A01D 34/6806 56/10.8 |
| 2005/0229568 A1* | 10/2005 | Nagai | A01D 69/03 56/10.8 |
| 2007/0151222 A1* | 7/2007 | Iida | A01D 69/06 56/157 |

* cited by examiner

VEHICLE WITH HYDROSTATIC TRANSMISSION

CROSS REFERENCE TO RELATED APPLICATIONS

The present patent application claims the benefit of U.S. Provisional Patent Application Ser. No. 61/918,724 filed Dec. 20, 2013, and entitled, Vehicle With Hydrostatic Transmission, the disclosures of which are incorporated herein by reference in entirety.

TECHNICAL FIELD

This invention relates generally to a vehicle with a hydrostatic transmission. More specifically, this invention relates to a zero turn radius vehicle having a prime mover engine with a substantially vertical output shaft and having a hydrostatic transmission with substantially vertical input and output shafts.

BACKGROUND OF THE INVENTION

Hydrostatic transmissions are well known and generally may include a hydraulic pump and a hydraulic motor. The hydraulic pump and the hydraulic motor may be arranged as separate components or may be combined together in an integral unit.

One use for such hydrostatic transmissions is, for example, zero turn radius vehicles such as zero turn radius lawn mowers. A separate hydrostatic transmission hydraulic pump and motor combination on each lateral side of the vehicle may drive one of the drive wheels of the vehicle. When the output hydraulic fluid flow rate of the two pumps is equal and the hydraulic motors rotate their associated wheels of the vehicle in the same direction at the same speed, the vehicle travels in a substantially straight line path in either the forward or the reverse direction. When the output hydraulic fluid flow rate of the two pumps is not equal and the hydraulic motors rotate their associated wheels in the same direction but at different speeds, the vehicle will turn. When one of the pump and motor combinations is rotating its associated wheel in one direction and the other pump and motor combination is rotating its associated wheel in the other direction at the same rotational speed, the vehicle will make a zero radius turn. An operator interface allows the vehicle operator to control the output hydraulic fluid flow rate of the two pumps to the motors, to control straight line or turning or zero radius turns for the vehicle.

In hydrostatic transmissions and systems and methods and vehicles, a prime mover engine such as for example a gasoline or diesel fuel engine frequently has a substantially vertical output shaft. The prime mover substantially vertical output shaft may drive a substantially vertical hydraulic pump input shaft through a drive mechanism such as for example a flexible drive belt. Because the drive wheels and axles of the vehicle necessarily have a substantially horizontal axis, the hydraulic motor output shaft of such hydrostatic transmissions that drives the axles and wheels may usually be arranged along a substantially horizontal axis. This arrangement of the hydraulic pump along a substantially vertical axis and the hydraulic motor along a substantially horizontal axis may require a substantially ninety degree mechanical and hydraulic interface connection between the pump and the motor. The ninety degree interface connection mechanically connects the pump and motor and hydraulically connects substantially vertically facing hydraulic fluid ports of the pump with substantially horizontally facing hydraulic fluid ports of the motor. The ninety degree interface connection may be relatively complex to manufacture.

SUMMARY OF THE INVENTION

The present invention addresses these and other technical problems by providing in one embodiment a hydrostatic transmission system and method and vehicle including such system and method. A substantially vertically disposed vehicle engine prime mover output shaft drives a substantially vertically disposed input shaft of a substantially vertically disposed hydraulic pump of a hydrostatic transmission of the vehicle. A substantially vertically disposed hydraulic motor of the hydrostatic transmission may have a substantially vertically disposed output shaft connected to the hydraulic pump by an interface connection or connecting block. The interface connection mechanically connects the pump and motor and hydraulically connects substantially vertically facing hydraulic fluid ports of the pump with substantially vertically facing hydraulic fluid ports of the motor. Since the longitudinal rotational axes and the hydraulic fluid ports of both the pump and the motor are all substantially vertically disposed, the mechanical and fluid connections of the interface connection may be arranged in a substantially straight line longitudinal or horizontal arrangement and may be substantially less complex and substantially less expensive than the ninety degree interface connection used with conventional substantially vertical pumps and substantially horizontal motors of conventional hydrostatic transmission used in zero turn vehicles.

In one embodiment of the invention, the substantially vertically disposed hydraulic motor of each hydrostatic transmission of the vehicle drives the associated substantially horizontally disposed drive axle and drive wheel of the vehicle. The substantially vertically disposed output shaft of each hydrostatic transmission hydraulic motor is mechanically drivingly connected to its associated drive axle and drive wheel of the vehicle through a bevel gear set. A substantially vertically disposed first bevel gear connected to the substantially vertically disposed output shaft of the hydraulic motor drives a substantially horizontally disposed second bevel gear mechanically connected to the substantially horizontally disposed drive axle and drive wheel associated with the hydrostatic transmission.

These and additional features of the invention are more fully described and particularly pointed out in the description and claims set out below, and this summary is not intended to identify key features or essential features of the claimed subject matter. The following description and claims and the annexed drawings set forth in detail certain illustrative embodiments of the invention, and these embodiments indicate but a few of the various ways in which the principles of the invention may be used. The claims set out below are incorporated by reference in this summary.

BRIEF DESCRIPTION OF THE DRAWINGS

Embodiments of this invention will now be described in further detail with reference to the accompanying drawings, in which.

DETAILED DESCRIPTION OF THE DRAWINGS

Figure 1:
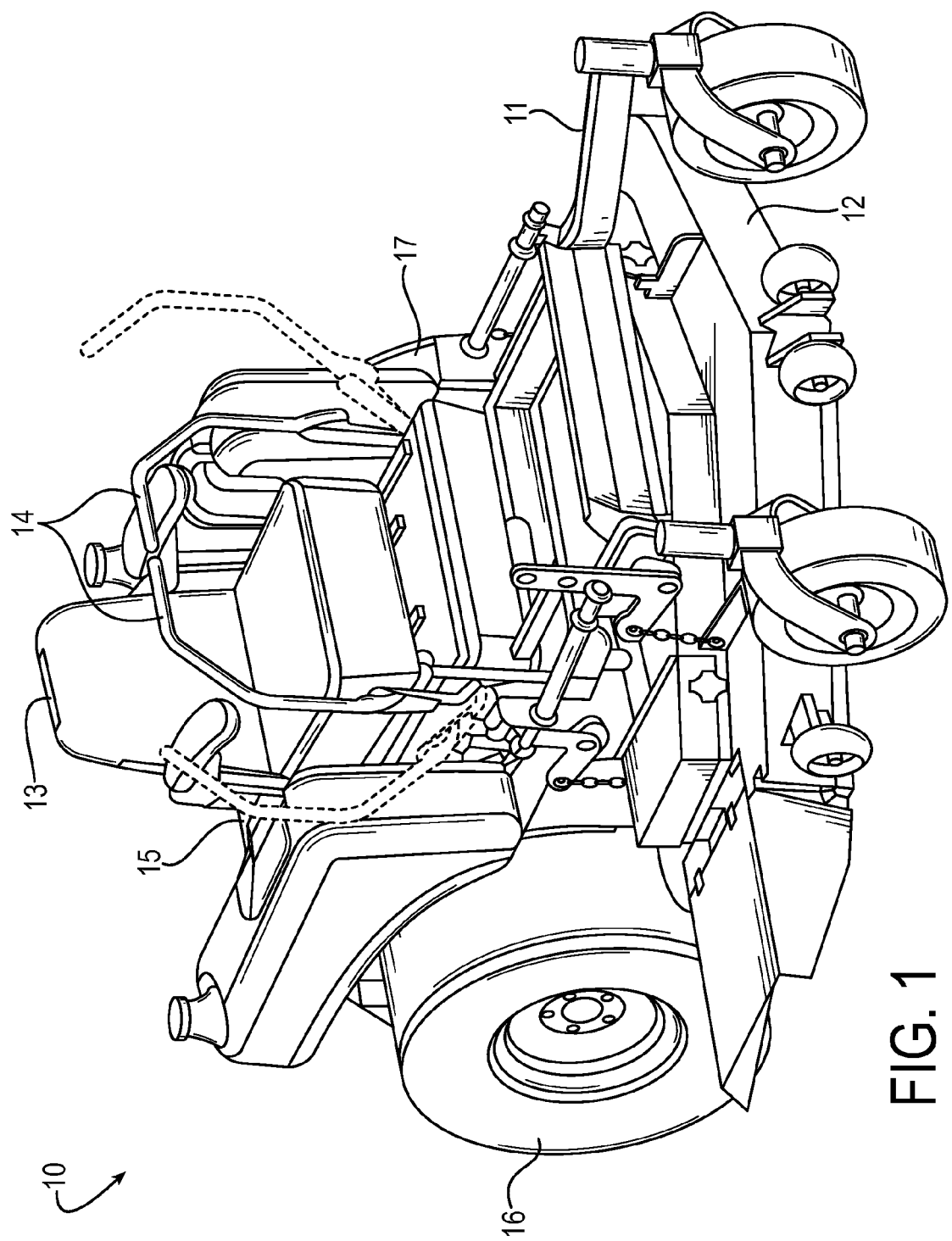
FIG. 1 is a perspective view of a zero turn radius vehicle having a hydrostatic transmission associated with each drive axle and drive wheel according to one embodiment of the invention.

Referring now to the drawings in greater detail, FIG. 1 illustrates a vehicle 10, which in the preferred embodiment is, for example, a zero turn radius lawn mower. The vehicle 10 includes a frame 11, a mower deck 12 supported by the frame 11, an operator seat 13, and operator actuated controls 14 for operating the mower 10. A rear mounted prime mover engine 15 is mounted to the frame 12 behind the seat 13 and provides power to first and second integrated hydrostatic transmissions not shown in FIG. 1. The hydrostatic transmissions can be controlled by controls 14 to independently drive right rear drive wheel 16 and left rear drive wheel 17 to propel the vehicle 10. The vehicle 10 is illustrated as one type of vehicle incorporating the invention, and other vehicle types can alternatively be used.

Figure 2:
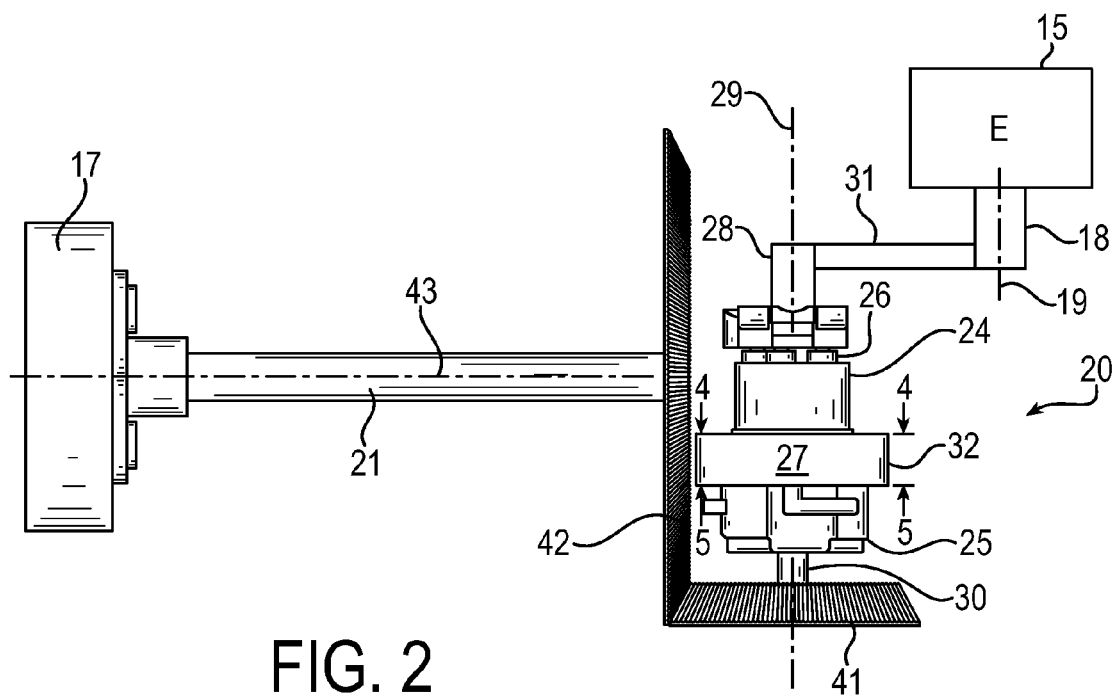
FIG. 2 is an elevation view of one of the hydrostatic transmissions and drive axles and drive wheels of the vehicle illustrated in FIG. 1.
Figure 3:
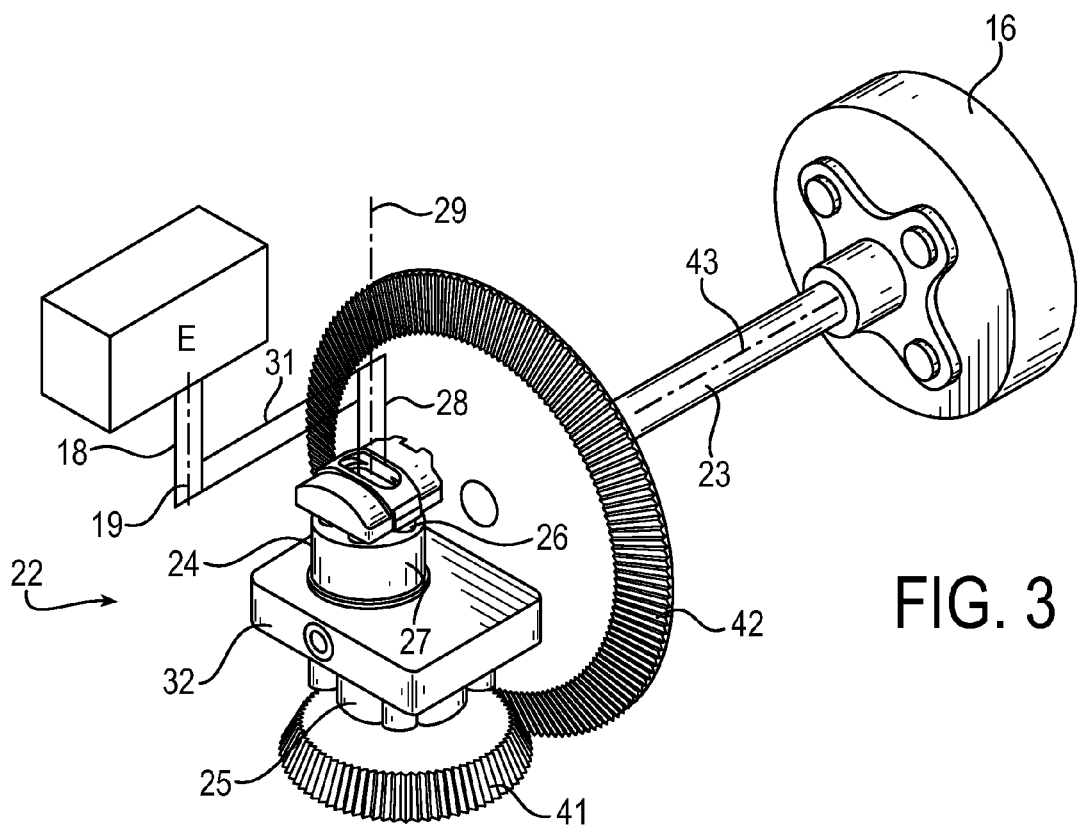
FIG. 3 is a perspective view of the other hydrostatic transmission and drive axle and drive wheel of the vehicle illustrated in FIG. 1.

As illustrated in FIGS. 2 and 3, prime mover engine 15 is substantially vertically disposed and includes a substantially vertical engine output shaft 18 arranged for rotation about a substantially vertical prime mover longitudinal axis 19. A left integrated hydrostatic transmission 20 drives left drive wheel 17 through left drive axle 21. A right integrated hydrostatic transmission 22 drives right drive wheel 16 through right drive axle 23. Left and right hydrostatic transmissions 20 and 22 are substantially identical, and each includes a hydraulic pump 24 and a hydraulic motor 25.

Each hydraulic pump 24 is, for example, an over center swashplate type variable displacement axial piston pump having axial pistons 26 arranged in a barrel 27 disposed in a suitable housing (not shown). A pump input shaft 28 is associated with each barrel 27 and is substantially vertically arranged for rotation about a substantially vertical pump longitudinal axis 29. Each hydraulic motor 25 is, for example, a high speed low torque fixed displacement gerotor type hydraulic motor disposed in a suitable housing. A motor output shaft 30 is associated with each motor 25 and is substantially vertically arranged for rotation about a substantially vertical motor longitudinal axis 29. Output shaft 18 of prime mover engine 15 is drivingly connected to input shafts 28 of hydraulic pumps 24 of the left and right hydrostatic transmissions 20 and 22 through a suitable drive link 31 which, for example, may be a conventional flexible belt. Prime mover output shaft 18 and pump input shaft 28 and motor output shaft 30 are substantially parallel and extend longitudinally in the same direction. Preferably, pump input shaft 28 and motor output shaft 30 are coaxial. Alternatively, pump input shaft 28 and motor output shaft 30 could extend in opposite directions, with pump 24 and motor 25 arranged side by side rather than in longitudinal alignment as illustrated in FIGS. 1-3.

Figure 4:
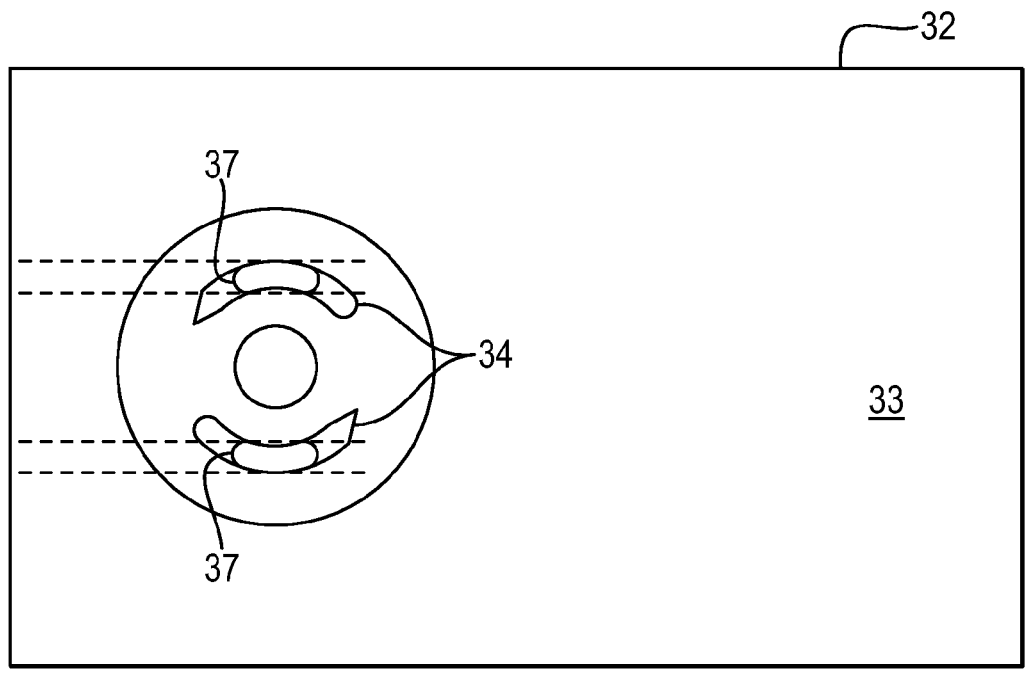
FIG. 4 is a top view of the interface connection or connecting block of the hydrostatic transmission illustrated in FIG. 2, taken generally along reference view line 4-4 in FIG. 2.
Figure 5:
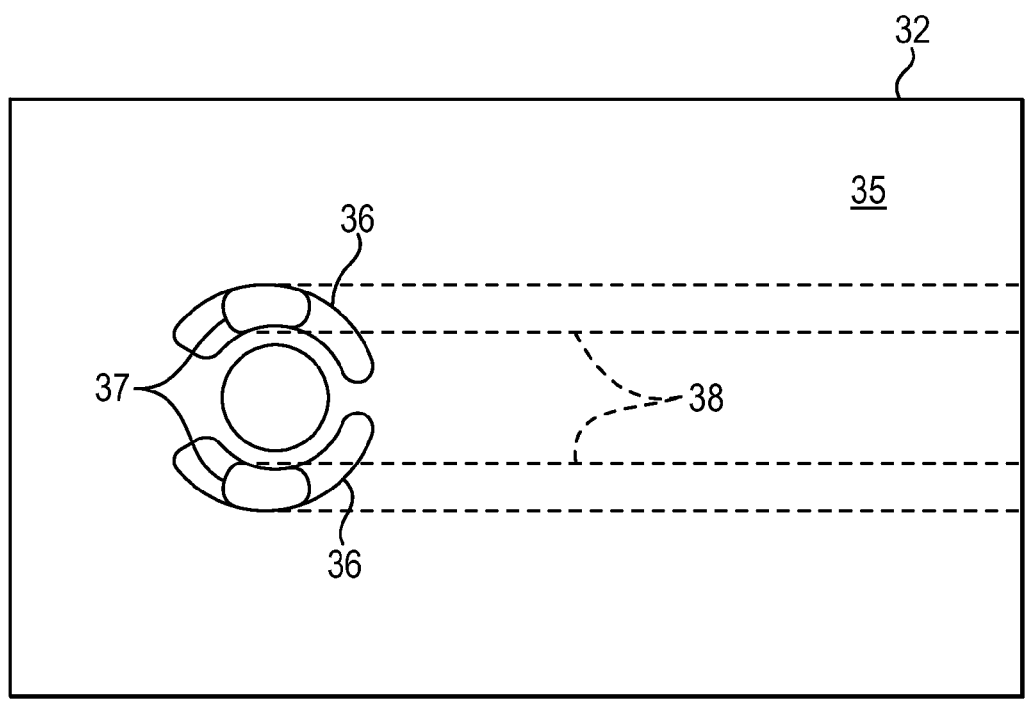
FIG. 5 is a bottom view of the interface connection or connecting block of the hydrostatic transmission illustrated in FIG. 2, taken generally along reference view line 5-5 in FIG. 2.
Figure 6:
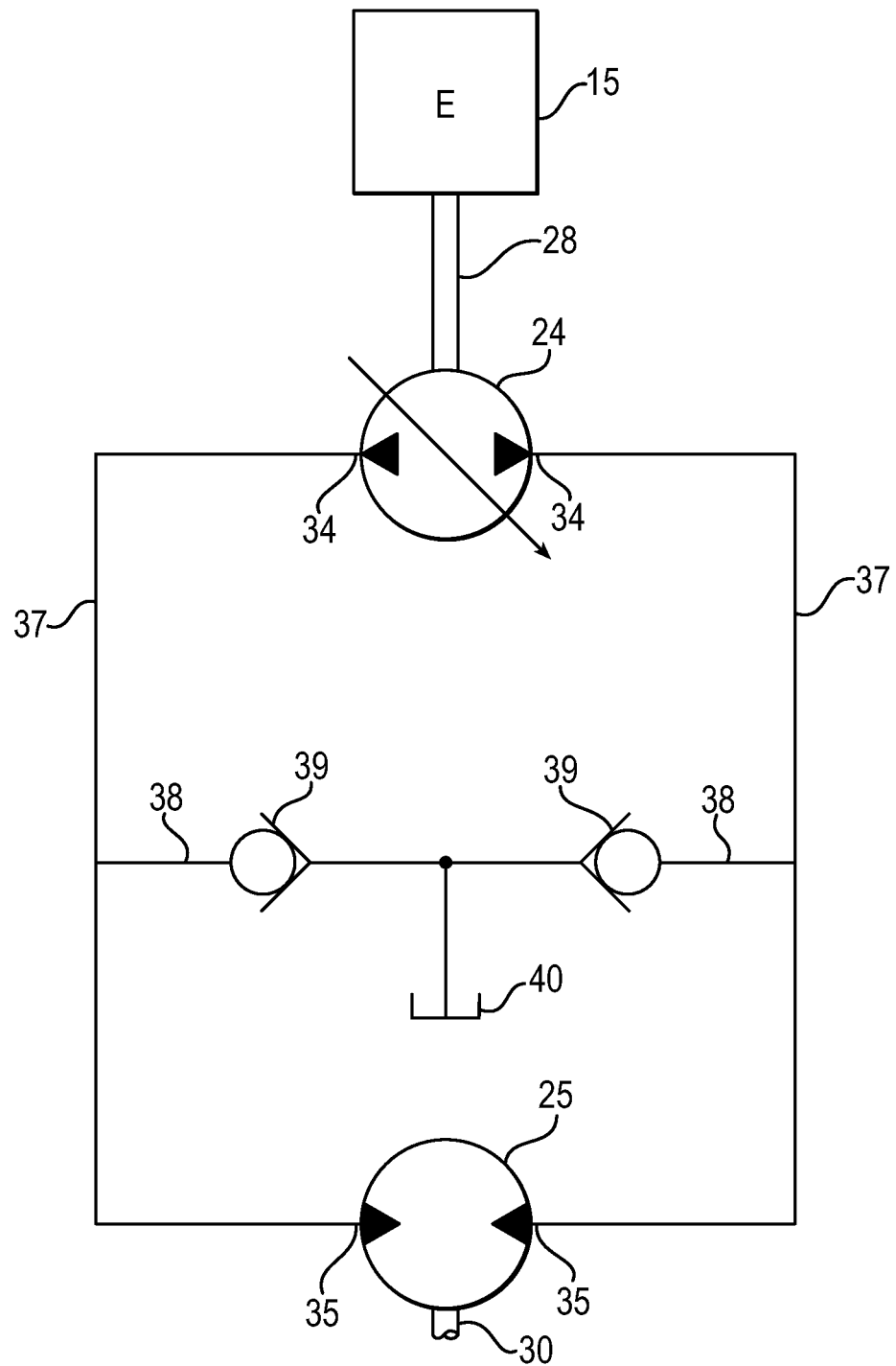
FIG. 6 is a hydraulic circuit diagram of the hydrostatic transmissions illustrated in FIGS. 2-13.
Figure 7:
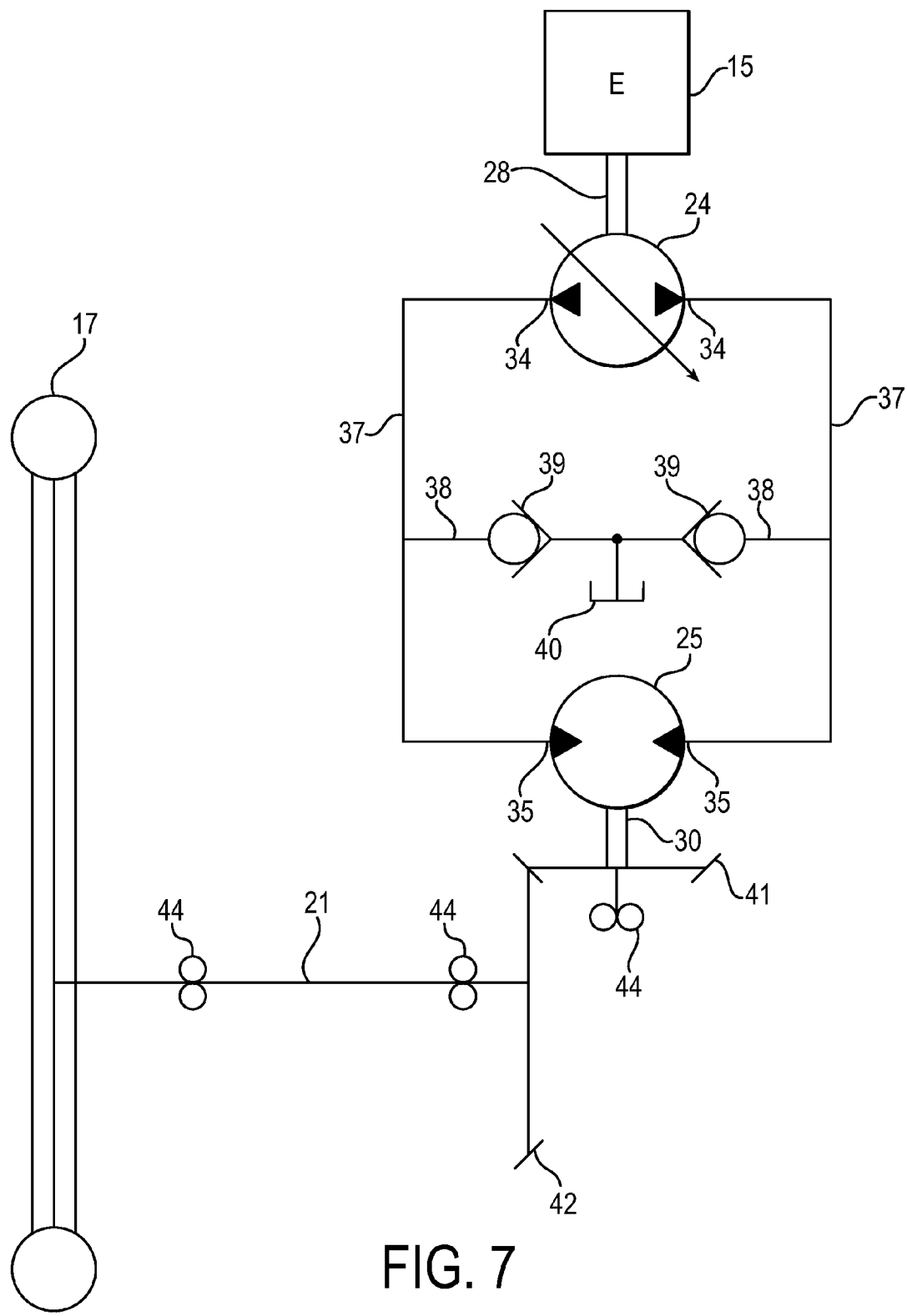
FIG. 7 is a gear train and hydraulic circuit diagram of the hydrostatic transmission and drive axle and drive wheel illustrated in FIG. 2.

As illustrated in FIGS. 4-6, an interface connection 32 is disposed intermediate each hydraulic pump 24 and hydraulic motor 25 of each hydrostatic transmission 20 and 22. The interface connection 32 in the preferred embodiment is a generally rectangular metal connection block. The top surface 33 of connection block 32, as illustrated in FIG. 4, faces and is longitudinally aligned with hydraulic pump 24. Top surface 33 includes longitudinally extending pump kidney ports or passages 34 that are longitudinally aligned with similar kidney ports or passages (not shown) in the surface of pump 24 that is assembled against top surface 33 with sealing contact. The bottom surface 35 of connection block 32, as illustrated in FIG. 5, faces and is longitudinally aligned with hydraulic motor 25. Bottom surface 35 includes longitudinally extending motor ports or passages 36 that are longitudinally aligned with ports, passages or openings (not shown) in the motor 25 that is assembled against or adjacent bottom surface 35. Laterally spaced apart longitudinally extending connecting passages 37 provide fluid communication between each pump kidney port 34 and its associated motor kidney port 36. In this manner, either pump kidney port 34 that is acting as a high pressure pump outlet port is connected through a passage 37 to a motor inlet port 36 to provide high pressure hydraulic fluid flow from a pump 24 to a motor 25 to drive the motor 25 and its associated drive wheel 16 or 17. Lateral passages 38 connect longitudinal passages 37 to conventional check valves 39. Check valves 39 close the high pressure side of each pump 24 and motor 25 to block communication to sump 40 and open the low pressure side of each pump 24 and motor 25 to draw from sump 40. Connecting passages 37 and 38 are substantially straight, facilitating ease and economy of casting or otherwise making the passages in connecting block 32.

Referring now to FIGS. 1-7, a bevel gear set is disposed intermediate each hydrostatic transmission 20, 22 and its associated drive axle 21, 23 and drive wheel 17, 16. Each bevel gear set includes a vertically disposed first bevel gear or pinion 41 drivingly connected to each motor output shaft 30 for rotation about vertical longitudinal axis 29. A second bevel gear 42 is drivingly connected to each wheel drive shaft 21 or 23 for rotation about horizontal drive shaft longitudinal axis 43. Suitable bearings 44 support radial and axial thrust loads imposed by bevel pinions 41 and bevel gears 42, and additional bearings (not shown) are also provided as required. As vertically disposed prime mover engine 15 drives the vertically disposed input shafts 28 of hydraulic pumps 24 of each hydrostatic transmission 20 and 22, high pressure fluid output from pumps 24 flows through interface connections 32 to rotate vertically disposed output shafts 30 of hydraulic motors 25. Output shafts 30 rotate vertically disposed bevel pinions 41, which rotate horizontally disposed bevel gears 42 and drive shafts 21 and 23, to drive wheels 17 and 16.

Figure 8:
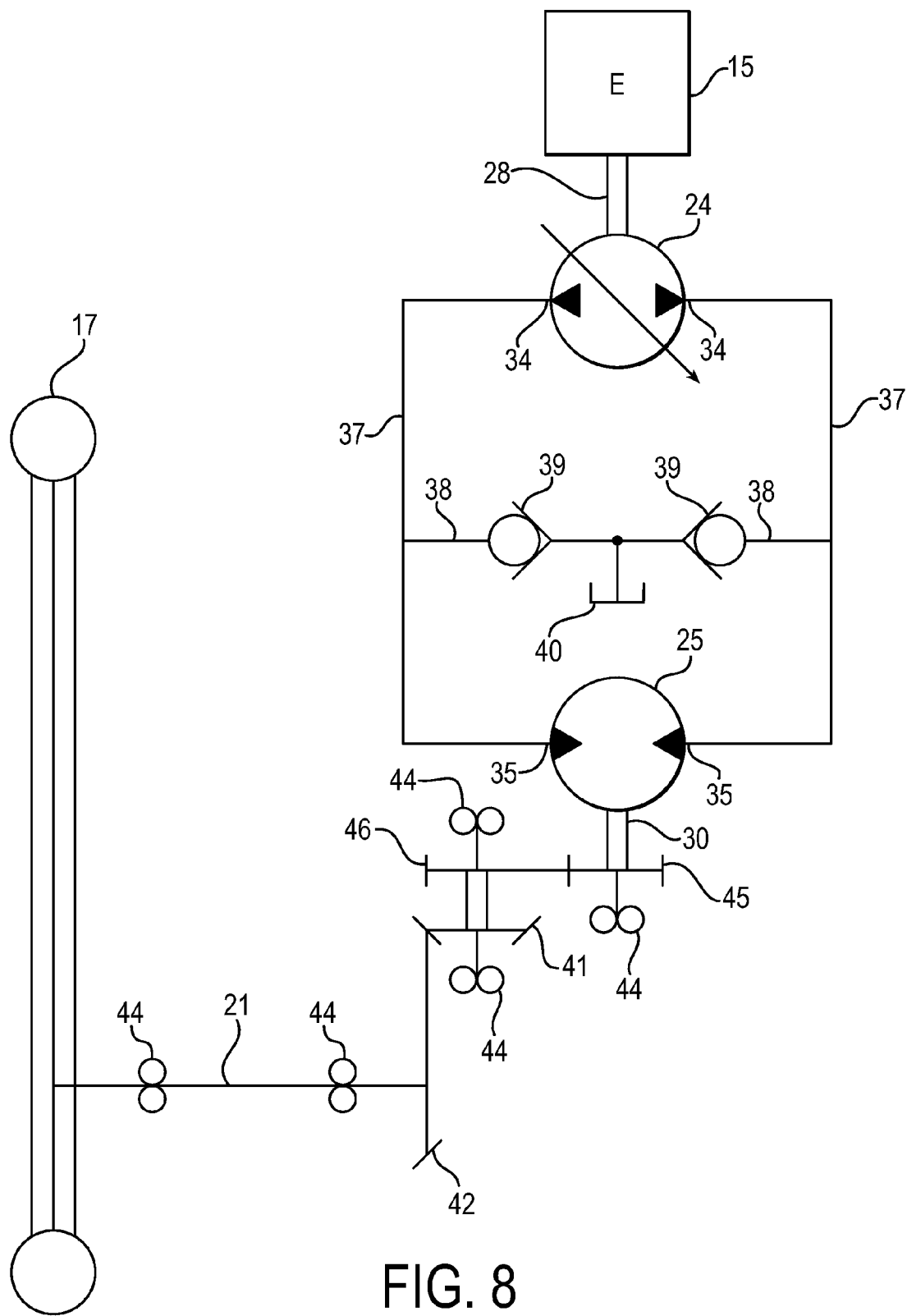
FIG. 8 is a gear train and hydraulic circuit diagram of a modification of the hydrostatic transmission and drive axle and drive wheel illustrated in FIG. 2.
Figure 9:
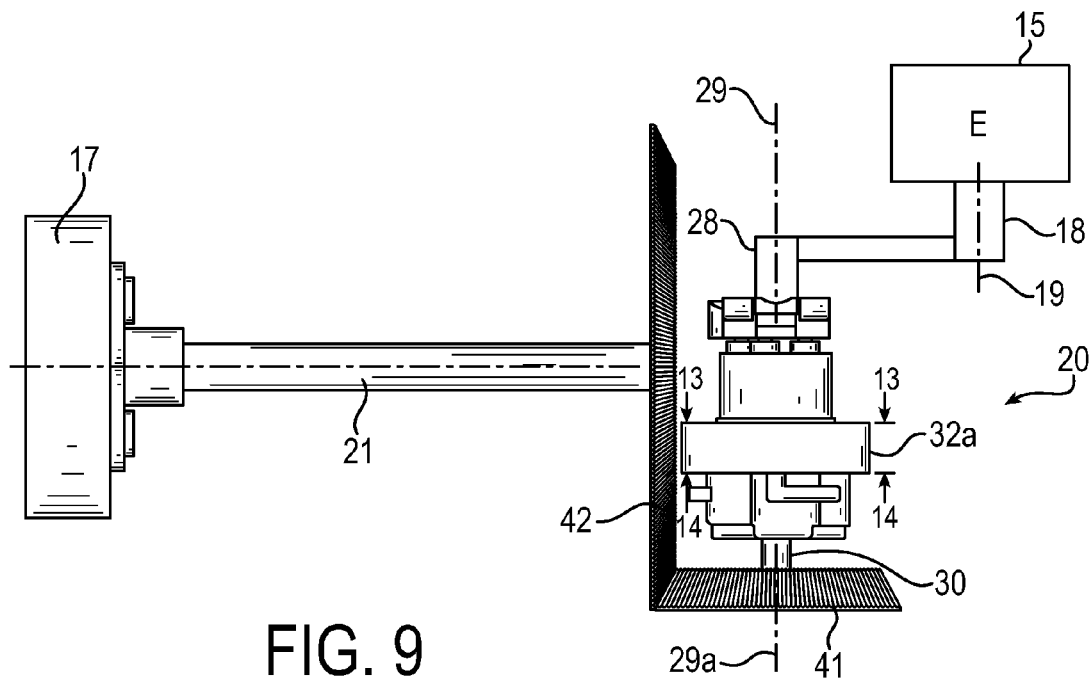
FIG. 9 is an elevation view of one of the hydrostatic transmissions and drive axles and drive wheels according to a second embodiment of the invention.
Figure 10:
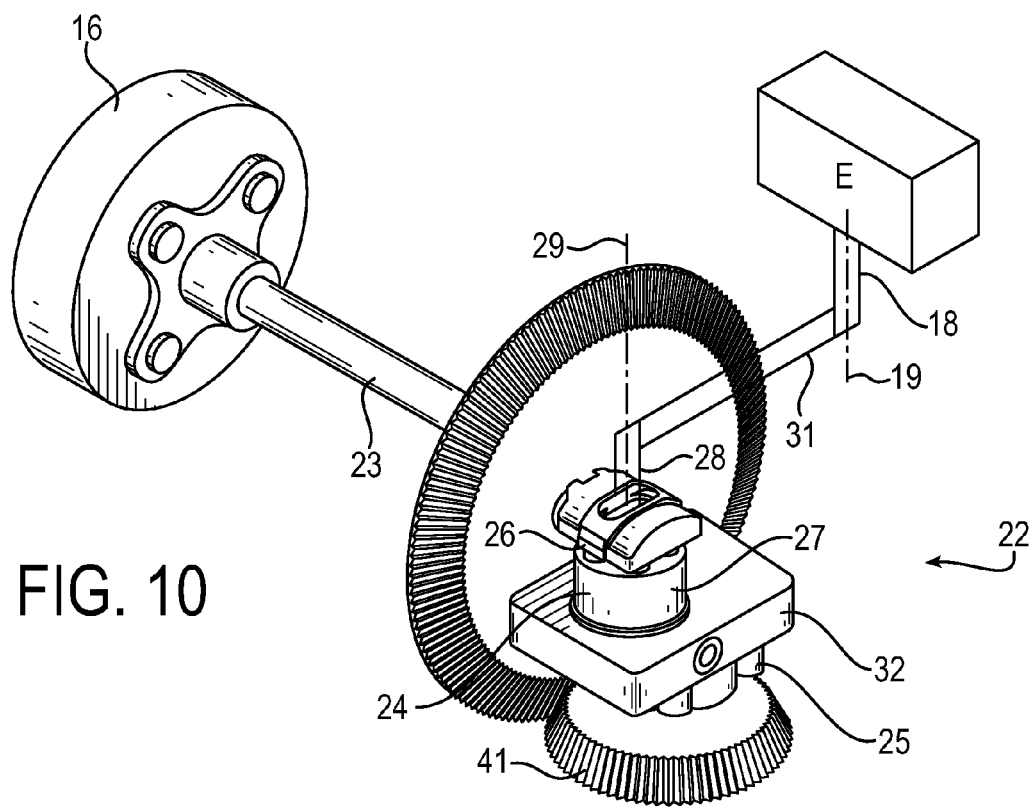
FIG. 10 is a perspective view of the other hydrostatic transmission and drive axle and drive wheel according to the second embodiment of the invention.
Figure 11:
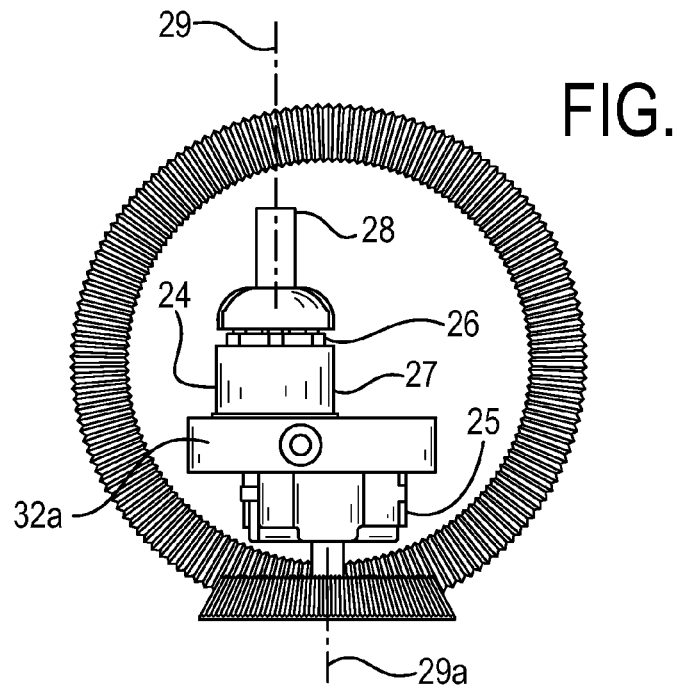
FIG. 11 is a side elevation view of the hydrostatic transmission illustrated in FIG. 9.
Figure 12:
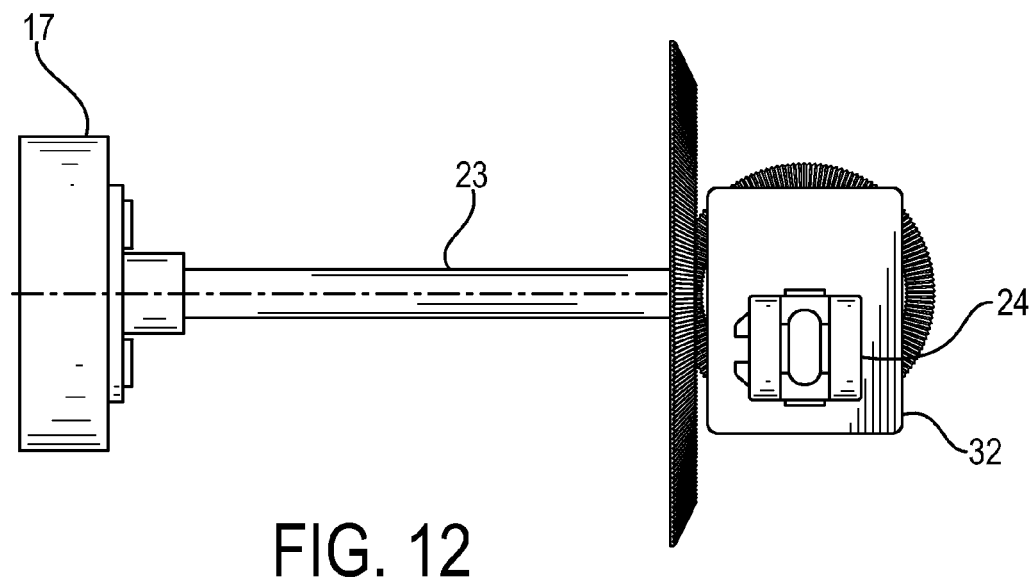
FIG. 12 is a top view of the hydrostatic transmission and drive axle and drive wheel illustrated in FIG. 9.
Figure 13:
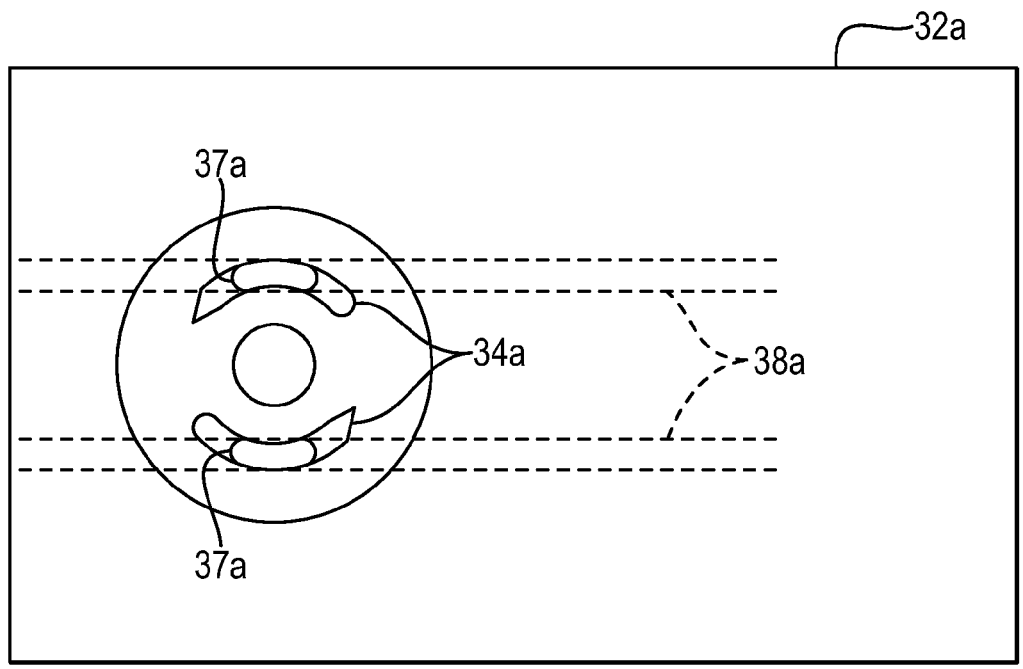
FIG. 13 is a top view of the interface connection or connecting block of the hydrostatic transmission Illustrated in FIG. 9, taken generally along reference view line 13-13 in FIG. 9.
Figure 14:
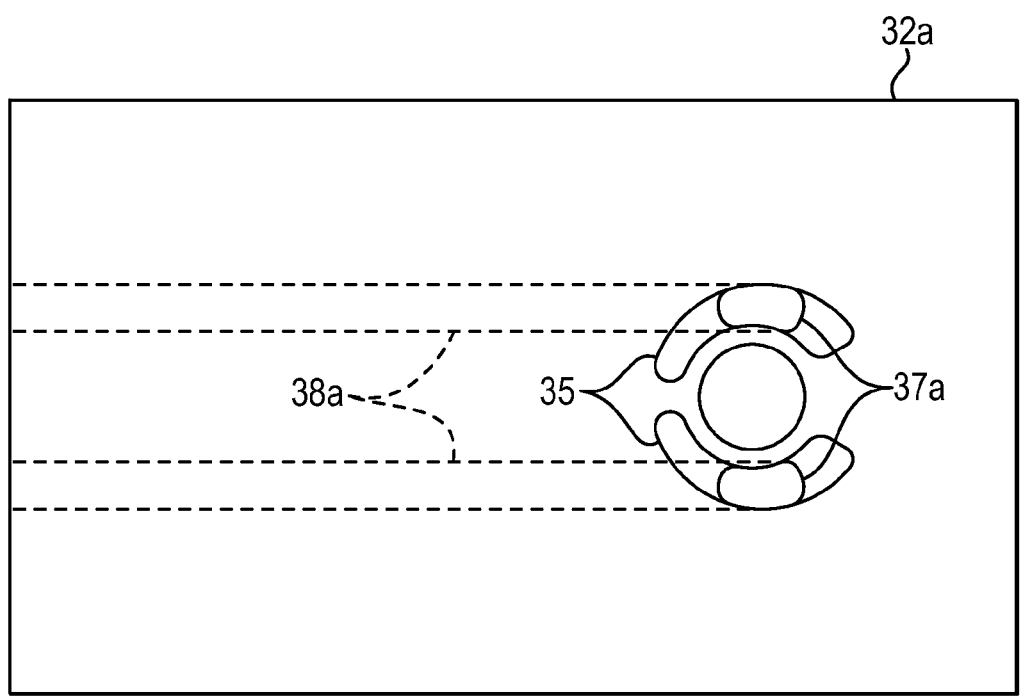
FIG. 14 is a bottom view of the interface connection or connecting block of the hydrostatic transmission illustrated in FIG. 9, taken generally along reference view line 14-14 in FIG. 9.

Referring now to FIG. 8, a second embodiment of the invention is illustrated. Reference numbers used in FIG. 8 that are the same as used in FIGS. 1-7 indicate the same components described above. The second embodiment adds spur gears 45 and 46 intermediate motor output shaft 30 and bevel pinion 41, to provide a second stage gear reduction.

Referring now to FIGS. 9-14, a third embodiment of the invention is illustrated. Reference numbers used in FIGS. 9-14 that are the same as used in FIGS. 1-7 indicate the same components described above. Reference numbers used in FIGS. 9-14 that are the same as used in FIGS. 1-7 but with a suffix "a" indicate components that are the same as described above except as otherwise illustrated or described. Hydraulic motor output shafts 30 of hydraulic motors 25 in FIGS. 9-14 rotate about a vertical longitudinal axis 29*a*, which is laterally offset but parallel relative to vertical longitudinal axis 29 of hydraulic pump shafts 28. Pump ports 34*a* are laterally offset relative to motor ports 35*a*. Longitudinal connecting passages 37*a* extend to lateral passages 38*a*, and high pressure fluid flow from pumps 24 reaches motors 25 through passages 37*a* and 38*a*.

Although the principles, embodiments and operation of the present invention have been described in detail herein, this is not to be construed as being limited to the particular illustrative forms disclosed. It will thus become apparent to those skilled in the art that various modifications of the embodiments herein can be made without departing from the spirit or scope of the invention.

The invention claimed is:

1. A vehicle comprising a prime mover engine, at least one drive wheel, a hydrostatic transmission associated with each drive wheel, and a gear set intermediate each hydrostatic transmission and associated drive wheel,
    the prime mover engine having a prime mover output shaft with a longitudinal axis,
    the hydrostatic transmission having:
        a hydraulic pump, the hydraulic pump having a pump input shaft with a longitudinal axis generally parallel to the longitudinal axis of the output shaft of the prime mover,
        a drive link drivingly connecting the prime mover output shaft to the pump input shaft,
        a hydraulic motor having an output shaft with a longitudinal axis generally parallel to the longitudinal axis of the output shaft of the prime mover, and
        an interface connector intermediate the hydraulic pump and the hydraulic motor, the interface connector having: (i) a first surface interfacing with the hydraulic pump and including at least two pump fluid ports, (ii) a second surface opposite and parallel to the first surface and interfacing with the hydraulic motor, wherein the second surface includes at least two motor fluid ports that are longitudinally aligned with the at least two pump fluid ports, and (iii) longitudinally extending connecting fluid passages that are substantially straight and fluidly couple the pump fluid ports to the motor fluid ports to establish fluid pressure communication between the hydraulic pump and the hydraulic motor,
    the gear set including a first bevel gear rotatably disposed about an axis generally parallel to the longitudinal axis of the output shaft of the prime mover, the first bevel gear being drivingly connected to the motor output shaft, and a second bevel gear rotatably disposed about an axis generally perpendicular to the longitudinal axis of the output shaft of the prime mover, and being drivingly connected to the drive wheel.

2. A vehicle as set forth in claim 1, including a second drive wheel and hydrostatic transmission and gear set substantially identical to the first mentioned drive wheel and hydrostatic transmission and gear set.

3. A vehicle as set forth in claim 1, wherein the longitudinal axis of the pump input shaft and the longitudinal axis of the motor output shaft are substantially coaxial.

4. A vehicle as set forth in claim 1, wherein the longitudinal axis of the pump input shaft and the longitudinal axis of the motor output shaft are substantially parallel and laterally offset.

5. A vehicle as set forth in claim 1, including a second gear set intermediate the motor output shaft and the drive wheel.

6. A vehicle as set forth in claim 1, wherein the longitudinal axis of the prime mover engine output shaft is substantially vertical.

7. A vehicle comprising a prime mover engine, at least one drive wheel, a hydrostatic transmission associated with each drive wheel, and a gear set intermediate each hydrostatic transmission and associated drive wheel,
    the prime mover engine having a substantially vertical prime mover output shaft with a substantially vertical longitudinal axis,
    the hydrostatic transmission having:
        a hydraulic pump, the hydraulic pump having a substantially vertical pump input shaft with a substantially vertical longitudinal axis,
        a drive link drivingly connecting the prime mover output shaft to the pump input shaft,
        a hydraulic motor having a substantially vertical output shaft with a substantially vertical longitudinal axis, and
        an interface connector intermediate the hydraulic pump and the hydraulic motor, the interface connector having: (i) a first surface interfacing with the hydraulic pump and including at least two pump fluid ports, (ii) a second surface opposite and parallel to the first surface and interfacing with the hydraulic motor, wherein the second surface includes at least two motor fluid ports that are longitudinally aligned with the at least two pump fluid ports, and (iii) longitudinally extending connecting fluid passages that are substantially straight and fluidly couple the pump fluid ports to the motor fluid ports to establish fluid pressure communication between the hydraulic pump and the hydraulic motor,
    the gear set including a first bevel gear rotatably disposed about a substantially vertical axis, the first bevel gear being drivingly connected to the motor output shaft, and a second bevel gear rotatably disposed about a substantially horizontal axis and being drivingly connected to the drive wheel.

8. A vehicle as set forth in claim 7, including a second drive wheel and hydrostatic transmission and gear set substantially identical to the first mentioned drive wheel and hydrostatic transmission and gear set.

9. A vehicle as set forth in claim 7, wherein the longitudinal axis of the pump input shaft and the longitudinal axis of the motor output shaft are substantially coaxial.

10. A vehicle as set forth in claim 7, wherein the longitudinal axis of the pump input shaft and the longitudinal axis of the motor output shaft are substantially parallel and laterally offset.

11. A vehicle as set forth in claim 7, including a second gear set intermediate the motor output shaft and the drive wheel.

12. A hydrostatic transmission and a gear set,
the hydrostatic transmission having:
a hydraulic pump, the hydraulic pump having a pump input shaft with a longitudinal axis, and
an interface connector intermediate the hydraulic pump and a hydraulic motor, the interface connector having: (i) a first surface interfacing with the hydraulic pump and including at least two pump fluid ports, (ii) a second surface opposite and parallel to the first surface and interfacing with the hydraulic motor, wherein the second surface includes at least two motor fluid ports that are longitudinally aligned with the at least two pump fluid ports, and (iii) longitudinally extending connecting fluid passages that are substantially straight and fluidly couple the pump fluid ports to the motor fluid ports to establish fluid pressure communication between the hydraulic pump and the hydraulic motor, wherein the hydraulic motor has an output shaft with a longitudinal axis,
the gear set including a first bevel gear rotatably disposed about an axis generally parallel to, or coaxial with, the longitudinal axis of the pump input shaft, the bevel gear being drivingly connected to the motor output shaft, and a second bevel gear rotatably disposed about an axis generally perpendicular to the axis of the first bevel gear and being drivingly connected to the first bevel gear.

13. A hydrostatic transmission and a gear set as set forth in claim 12, wherein the longitudinal axis of the pump input shaft and the longitudinal axis of the motor output shaft are substantially coaxial.

14. A hydrostatic transmission and a gear set as set forth in claim 12, wherein the longitudinal axis of the pump input shaft and the longitudinal axis of the motor output shaft are substantially parallel and laterally offset.

* * * * *